(12) United States Patent
Jung et al.

(10) Patent No.: US 11,791,486 B2
(45) Date of Patent: Oct. 17, 2023

(54) METHOD FOR OPERATING FUEL CELL POWER GENERATION SYSTEM

(71) Applicants: Hyundai Motor Company, Seoul (KR); Kia Corporation, Seoul (KR)

(72) Inventors: Ju Hae Jung, Gyeonggi-do (KR); Sun Hee Jo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/693,568

(22) Filed: Mar. 14, 2022

(65) Prior Publication Data
US 2023/0025752 A1    Jan. 26, 2023

(30) Foreign Application Priority Data

Jul. 14, 2021   (KR) ........................ 10-2021-0092423

(51) Int. Cl.
*H01M 8/04664* (2016.01)
*H01M 8/04955* (2016.01)
*H01M 8/043* (2016.01)

(52) U.S. Cl.
CPC ....... *H01M 8/04679* (2013.01); *H01M 8/043* (2016.02); *H01M 8/04955* (2013.01); *H01M 2250/20* (2013.01)

(58) Field of Classification Search
CPC ............. H01M 8/04679; H01M 8/043; H01M 8/04955
See application file for complete search history.

(56) References Cited

U.S. PATENT DOCUMENTS

| | | | |
|---|---|---|---|
| 11,557,777 B2* | 1/2023 | Baba ................. | H01M 8/04679 |
| 2005/0142406 A1* | 6/2005 | Obata ............... | H01M 8/04589 429/432 |

FOREIGN PATENT DOCUMENTS

| | | |
|---|---|---|
| KR | 2004-0064660 A | 7/2004 |
| KR | 2021-0129756 A | 10/2021 |

* cited by examiner

*Primary Examiner* — Stewart A Fraser
(74) *Attorney, Agent, or Firm* — Fox Rothschild LLP

(57) ABSTRACT

A method for operating a fuel cell power generation system is presented and includes sequentially resting fuel cell modules corresponding to a designated reference module number, from among all fuel cell modules of the fuel cell power generation system, during a designated number of cycles while operating remaining fuel cell modules, gradually reducing a number of the fuel cell modules sequentially rested during the cycles from the reference module number, whenever average performance of the fuel cell modules is sequentially reduced by exceeding designated reference levels configured to be sequentially set, and repairing or replacing the fuel cell modules when the average performance of the fuel cell modules is reduced by a designated lower limit or more.

8 Claims, 9 Drawing Sheets

FIG.3

| | | Cycle 1 | Cycle 2 | Cycle 3 | Cycle 4 | Cycle 5 | Cycle 6 | Cycle 7 | Cycle 8 | Cycle 9 | Cycle 10 |
|---|---|---|---|---|---|---|---|---|---|---|---|
| | | | | | | | 1Cycle = 3Hour | | | | |
| output (kW) | module 1 | operated | operated | operated | operated | rested | operated | operated | operated | operated | rested |
| | module 2 | operated | operated | operated | operated | rested | operated | operated | operated | operated | rested |
| | module 3 | operated | operated | operated | rested | operated | operated | operated | operated | rested | operated |
| | module 4 | operated | operated | operated | rested | operated | operated | operated | operated | rested | operated |
| | module 5 | operated | operated | rested | operated | operated | operated | operated | rested | operated | operated |
| | module 6 | operated | operated | rested | operated | operated | operated | operated | rested | operated | operated |
| | module 7 | operated | rested | operated | operated | operated | operated | rested | operated | operated | operated |
| | module 8 | operated | rested | operated | operated | operated | operated | rested | operated | operated | operated |
| | module 9 | rested | operated | operated | operated | operated | rested | operated | operated | operated | operated |
| | module 10 | rested | operated | operated | operated | operated | rested | operated | operated | operated | operated |
| | OUTPUT OF SYSTEM | 500 | 500 | 500 | 500 | 500 | 500 | 500 | 500 | 500 | 500 |

FIG.5

| | | Cycle 1 | Cycle 2 | Cycle 3 | Cycle 4 | Cycle 5 | Cycle 6 | Cycle 7 | Cycle 8 | Cycle 9 | Cycle 10 |
|---|---|---|---|---|---|---|---|---|---|---|---|
| | | | | | | 1Cycle = 3Hour | | | | | |
| | module 1 | operated | operated | operated | operated | operated | operated | operated | operated | operated | rested |
| | module 2 | operated | operated | operated | operated | operated | operated | operated | operated | rested | operated |
| | module 3 | operated | operated | operated | operated | operated | operated | operated | rested | operated | operated |
| | module 4 | operated | operated | operated | operated | operated | operated | rested | operated | operated | operated |
| | module 5 | operated | operated | operated | operated | operated | rested | operated | operated | operated | operated |
| | module 6 | operated | operated | operated | operated | rested | operated | operated | operated | operated | operated |
| | module 7 | operated | operated | operated | rested | operated | operated | operated | operated | operated | operated |
| | module 8 | operated | operated | rested | operated | operated | operated | operated | operated | operated | operated |
| | module 9 | operated | rested | operated | operated | operated | operated | operated | operated | operated | operated |
| | module 10 | rested | operated | operated | operated | operated | operated | operated | operated | operated | operated |
| output (kW) | OUTPUT OF SYSTEM | 500 | 500 | 500 | 500 | 500 | 500 | 500 | 500 | 500 | 500 |

FIG.6

| | | Cycle 1 | Cycle 2 | Cycle 3 | Cycle 4 | Cycle 5 | Cycle 6 | Cycle 7 | Cycle 8 | Cycle 9 | Cycle 10 |
|---|---|---|---|---|---|---|---|---|---|---|---|
| | | | | | | 1Cycle = 3Hour | | | | | |
| output (kW) | module 1 | operated | operated | operated | operated | operated | operated | operated | operated | operated | operated |
| | module 2 | operated | operated | operated | operated | operated | operated | operated | operated | operated | operated |
| | module 3 | operated | operated | operated | operated | operated | operated | operated | operated | operated | operated |
| | module 4 | operated | operated | operated | operated | operated | operated | operated | operated | operated | operated |
| | module 5 | operated | operated | operated | operated | operated | operated | operated | operated | operated | operated |
| | module 6 | operated | operated | operated | operated | operated | operated | operated | operated | operated | operated |
| | module 7 | operated | operated | operated | operated | operated | operated | operated | operated | operated | operated |
| | module 8 | operated | operated | operated | operated | operated | operated | operated | operated | operated | operated |
| | module 9 | operated | operated | operated | operated | operated | operated | operated | operated | operated | operated |
| | module 10 | operated | operated | operated | operated | operated | operated | operated | operated | operated | operated |
| | OUTPUT OF SYSTEM | 500 | 500 | 500 | 500 | 500 | 500 | 500 | 500 | 500 | 500 |

FIG.8

| OPERATING TIME OF MODULES | RESTING TIME OF MODULES | TOTAL OPERATING TIME OF SYSTEM | TOTAL OPERATING TIME OF MODULES | TOTAL RESTING TIME OF MODULES | TOTAL NUMBER OF APPLICATIONS OF REST | PERFORMANCE REDUCTION | PERFORMANCE REDUCTION RATE (%/hr) |
|---|---|---|---|---|---|---|---|
| 2hr | 0.5hr | 500hr | 400hr | 100hr | 200.0 | -6.8% | -0.01361 |
| 12hr | 3hr | | | | 33.3 | -6.0% | -0.01206 |
| 36hr | 9hr | | | | 11.1 | -7.3% | -0.01476 |

FIG. 9

|  | RESULTS OF PROGRESS OF ACCELERATED DEGRADATION 100 TIMES | | | |
| --- | --- | --- | --- | --- |
|  | NO RESTING | RESTING TIME OF MODULES | | |
|  |  | 0.5hr | 3hr | 9hr |
| PERFORMANCE REDUCTION RATE (%) | −5.8 | −4.3 | −5.5 | −9.7 |
| STACK TEMPERATURE | MAINTAIN 80°C | > 60°C | > 46°C | > ROOM TEMPERATURE |

METHOD FOR OPERATING FUEL CELL POWER GENERATION SYSTEM

CROSS-REFERENCE TO RELATED APPLICATION

This application claims under 25 U.S.C. § 119(a) the benefit of Korean Patent Application No. 10-2021-0092423, filed on Jul. 14, 2021 in the Korean Intellectual Property Office, the entire contents of which are incorporated herein by reference.

BACKGROUND

1. Technical Field

The present invention relates to technology that operates a fuel cell power generation system.

2. Description of the Related Art

A fuel cell power generation system is configured to produce electricity through a plurality of fuel cell modules using hydrogen and oxygen in the air as fuel and then to supply electricity through a power network.

Performance of the fuel cell modules included in the fuel cell power generation system is continuously reduced when a vehicle is driven for a long period of time. One of main causes of performance reduction is that oxygen reduction reaction is decreased as an oxidation film of a cathode catalyst is gradually thickened.

The above information disclosed in the Background section is only for enhancement of understanding of the disclosed embodiments and should not be interpreted as conventional technology that is already known to those skilled in the art.

SUMMARY

Therefore, embodiments of the present disclosure have been made in view of the above problems. It is an object of the disclosed embodiments to provide a method for operating a fuel cell power generation system which may improve durability of the fuel cell power generation system while maintaining the stable operation rate of the fuel cell power generation system, so as to improve the lifespan of the fuel cell power generation system.

In accordance with embodiments of the present disclosure, a method for operating a fuel cell power generation system is provided. The method includes sequentially resting fuel cell modules corresponding to a designated reference module number, from among all fuel cell modules of the fuel cell power generation system, during a designated number of cycles while operating remaining fuel cell modules, gradually reducing a number of the fuel cell modules sequentially rested during the cycles from the reference module number, whenever average performance of the fuel cell modules is sequentially reduced by exceeding designated reference levels configured to be sequentially set, and repairing or replacing the fuel cell modules when the average performance of the fuel cell modules is reduced by a designated lower limit or more.

As the average performance of the fuel cell modules is gradually reduced, the average performance of the fuel cell modules may be reduced by the lower limit in a state in which the number of the fuel cell modules sequentially rested during the cycles is reduced to 0.

The reference module number may be set to 20% of a total number of the fuel cell modules of the fuel cell power generation system.

The designated reference levels configured to compare the average performance of the fuel cell modules therewith may be set to be sequentially reduced by 10% from the average output performance of new fuel cell modules.

The lower limit may be set to be reduced by 30% from the average output performance of new fuel cell modules.

The cycle may be set to a resting time. In consideration of both a degree of performance reduction of the fuel cell modules depending on a resting time during operation of the fuel cell modules in a normal condition and a degree of performance reduction of the fuel cell modules depending on a resting time during operation of the fuel cell modules in an accelerated degradation condition, both degrees of performance reduction of the fuel cell modules MD are minimized.

The cycle may be set to be in a time range that is greater than 0.5 hours and is less than or equal to 3 hours.

The cycle may be set to 3 hours, and a process of sequentially resting some of the fuel cell modules of the fuel cell power generation system for 3 hours during operation of the fuel cell power generation system and then restarting the corresponding fuel cell modules may be repeated.

BRIEF DESCRIPTION OF THE DRAWINGS

The above and other objects, features and other advantages of embodiments of the present disclosure will be more clearly understood from the following detailed description taken in conjunction with the accompanying drawings, in which:

FIG. 3 is a table representing the method according to one embodiment of the present disclosure, illustrating an operating state in which the number of rested fuel cell modules is set to 2;

FIG. 5 is a table representing the method according to one embodiment of the present disclosure, illustrating an operating state in which the number of rested fuel cell modules is set to 1;

FIG. 6 is a table representing the method according to one embodiment of the present disclosure, illustrating an operating state in which all fuel cell modules are operated;

FIG. 8 is a table representing test results acquired by varying a resting time and the number of applications of rest during operation of the fuel cell modules in a normal condition; and FIG. 9 is a table representing a degree of performance reduction depending on the resting time during operation of the fuel cell modules in an accelerated degradation condition.

DETAILED DESCRIPTION OF THE PREFERRED EMBODIMENTS

Figure 1:
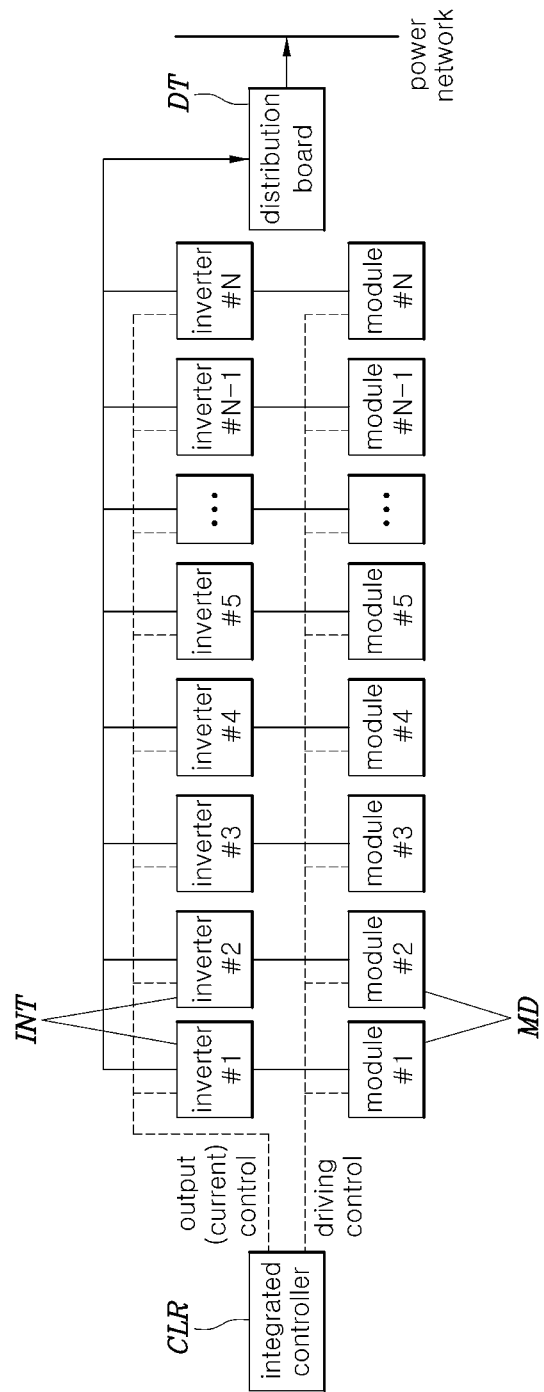
FIG. 1 is a block diagram exemplarily illustrating a fuel cell power generation system to which a method for operating a fuel cell power generation system according to embodiments of the present disclosure is applicable.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely disclose the disclosure and cover modifications, equivalents or alternatives which come within the scope and technical range of the disclosure.

In the following description of the embodiments, terms, such as "first" and "second," are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosed embodiments.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to exemplary embodiments of the present disclosure, examples of which are illustrated in the accompanying drawings and described below. In the drawings, the same or similar elements are denoted by the same reference numerals even when they are depicted in different drawings.

FIG. 1 is a block diagram illustrating a fuel cell power generation system to which a method for operating a fuel cell power generation system according to the present disclosure is applicable. The fuel cell power generation system includes a plurality of fuel cell modules MD and that are configured such that electric power produced by the respective fuel cell modules MD may be converted into alternating current by inverters INT and then alternating current may be supplied to a power network through a distribution board DT. The respective inverters INT and the respective fuel cell modules MD are controlled by an integrated controller CLR.

Figure 2:
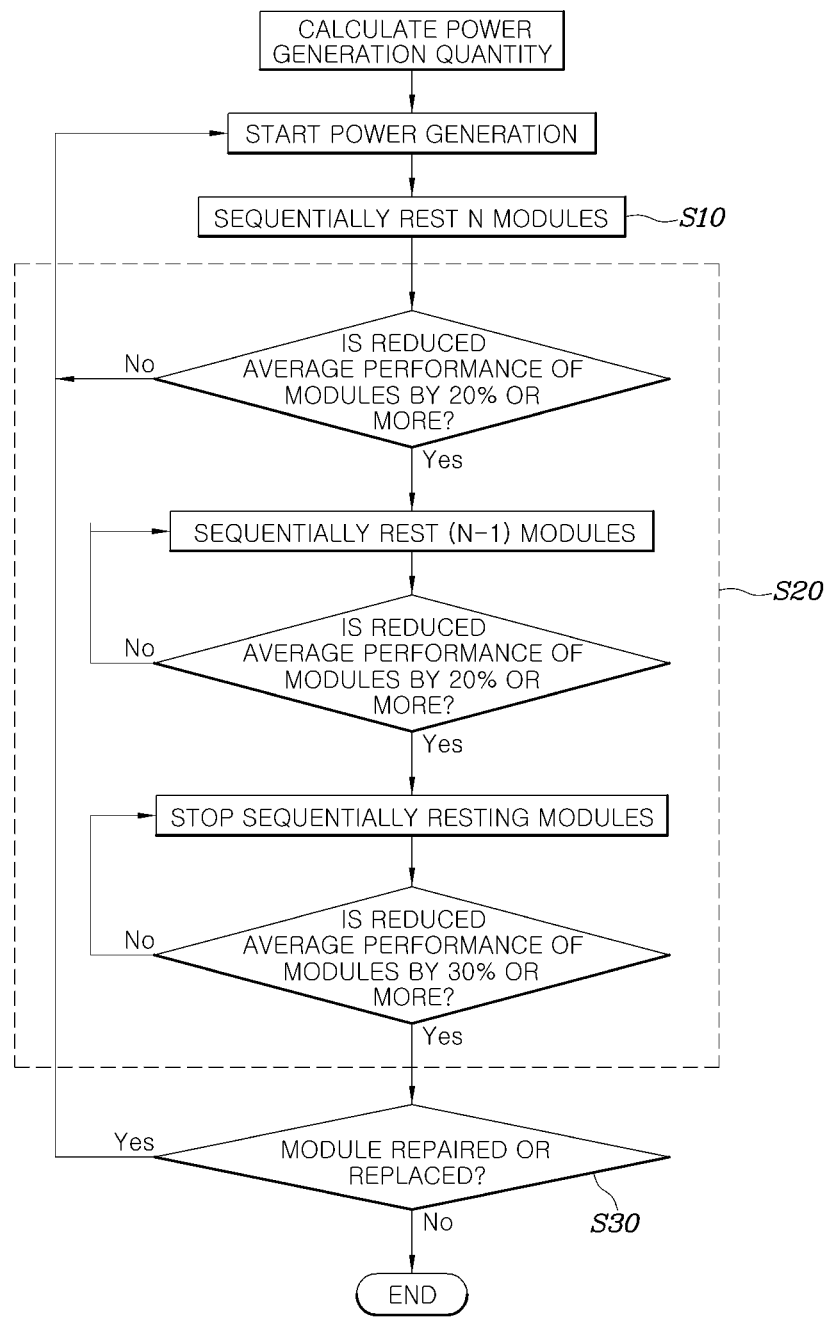
FIG. 2 is a flowchart representing a method for operating a fuel cell power generation system according to one embodiment of the present disclosure.

Referring to FIG. 2, a method for operating the fuel cell power generation system according to one embodiment of the present disclosure is illustrated. The method includes sequentially resting fuel cell modules MD corresponding to a designated reference module number N, from among all the fuel cell modules MD included in the fuel cell power generation system, during a designated number of cycles while operating remaining fuel cell modules MD (S10). The method also includes gradually reducing the number of the fuel cell modules MD sequentially rested during the number of cycles from the reference module number N, whenever the average performance of the fuel cell modules MD is sequentially reduced by exceeding designated reference levels configured to be sequentially set (S20). The method additionally includes repairing or replacing the fuel cell modules MD when the average performance of the fuel cell modules MD is reduced by a designated lower limit or more (S30).

That is, all the fuel cell modules MD included in the fuel cell power generation system according to the present disclosure are not simultaneously operated. Rather, some fuel cell modules MD are operated while sequentially resting fuel cell modules MD corresponding to the reference module number N in an initial stage. Whenever the average performance of the fuel cell modules MD is reduced by exceeding the reference levels, the number of the rested fuel cell modules MD is gradually reduced from the reference module number N.

Here, the initial stage in which the fuel cell modules MD corresponding to the reference module number N are sequentially rested means a time at which all the fuel cell modules MD included in the fuel cell power generation system are new products. The performance of the fuel cell modules MD means output performance of the fuel cell modules MD.

In embodiments of the present disclosure, as the average performance of the fuel cell modules MD is gradually reduced, the average performance of the fuel cell modules MD is reduced by the lower limit in the state in which the number of the fuel cell modules MD sequentially rested during the cycles is reduced to 0.

That is, as the average performance of the fuel cell modules MD is gradually reduced, as described above, the number of the rested fuel cell modules MD is gradually reduced from the reference module number N. As a result, all the fuel cell modules MD are operated without resting any fuel cell modules MD, thereby allowing the average performance of the fuel cell modules MD to be reduced by the lower limit during implementation of the target output of the fuel cell power generation system.

For this purpose, the reference module number N, the reference levels and the lower limit must be appropriately set depending on the above-described objects.

The reference module number N may be set to 20% of the total number of the fuel cell modules MD included in the fuel cell power generation system.

That is, for example, when the total number of the fuel cell modules MD included in the fuel cell power generation system is 10, the reference module number N may be set to 2.

FIG. 3 is a table representing a process in which the fuel cell power generation system includes ten fuel cell modules MD which are new products. The reference module number N is set to 2 such that eight fuel cell modules MD are operated and two fuel cell modules MD corresponding to the reference module number N are sequentially rested during the cycles until performance of the respective fuel cell modules MD is reduced by 10% from the initial output performance.

For example, among the fuel cell modules MD included in the fuel cell power generation system, module 1 is controlled to be operated during four cycles from cycle 1 to cycle 4, to be rested in cycle 5, to be restarted in cycle 6 so as to be operated up to cycle 9, and then to be rested again in cycle 10.

Of course, the cycles during which the respective fuel cell modules MD are sequentially rested are sequentially disposed so that the output of the fuel cell power generation system may uniformly maintain 500 kW in the respective cycles, as shown in FIG. 3.

Figure 4:
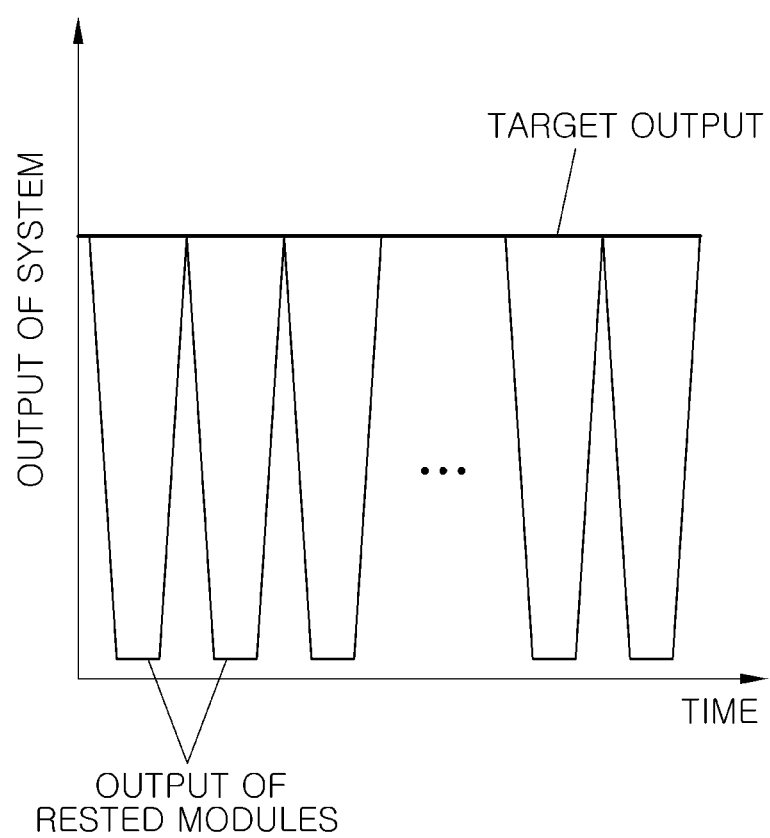
FIG. 4 is a graph representing a case that some fuel cell module are rested and then restarted while maintaining a constant target output, during operation of the fuel cell power generation system, according to one embodiment of the present disclosure.

That is, as shown in FIG. 4, while the target output of the fuel cell power generation system may remain constant as time goes by, a process of resting and then restarting some of the fuel cell modules MD included in the fuel cell power generation system is repeated. When a fuel cell module is rested and then restarted, an oxidation film accumulated on a cathode catalyst of the corresponding fuel cell module MD is removed. Thus, improvement in durability of the fuel cell module MD and increase in the lifespan of the fuel cell module MD are achieved, thereby improving the durability and lifespan of the overall fuel cell power generation system.

The designated reference levels configured to compare the average performance of the fuel cell modules MD therewith may be set to be sequentially reduced by 10% from the average output performance of new fuel cell modules MD.

That is, the fuel cell power generation system is operated such that the number of the rested fuel cell modules MD is maintained at 2 until the output of the fuel cell modules MD is reduced by 10% from the output performance of new fuel cell modules MD, as stated with reference to FIG. 3. Thereafter, the fuel cell power generation system is operated such that the fuel cell modules MD are sequentially rested during the cycles so as to maintain the number of the rested fuel cell modules MD at 1, which is reduced by one from the reference module number N, as shown in FIG. 5.

FIG. 5 is a table representing a case that the output of the respective fuel cell modules MD is reduced by 20% from the average output performance of new fuel cell modules MD. In this case, the fuel cell power generation system is operated such that the fuel cell modules MD are sequentially rested during the cycles so as to allow one fuel cell module MD to be rested before the output of the respective fuel cell modules MD is reduced by such a level.

When the output of the fuel cell modules MD included in the fuel cell power generation system is reduced by 20% or more from the average output performance of new fuel cell modules MD, as described above, all the fuel cell modules MD are operated so as to satisfy the target output of the fuel cell power generation system without resting any fuel cell modules MD, as shown in FIG. 6.

In this embodiment, the lower limit may be set to be reduced by 30% from the average output performance of new fuel cell modules MD.

Therefore, the fuel cell power generation system is continuously operated such that all the fuel cell modules MD are operated so as to satisfy the target output, as shown in FIG. 6. Then, when the output of the respective fuel cell modules MD is reduced by 30% or more from the average output performance of the new fuel cell modules MD, the respective fuel cell modules MD are determined to have reached the end of the lifespan thereof, and are repaired or replaced.

That is, in the case that the fuel cell power generation system includes the fuel cell modules MD which are new products, when the methods shown in FIGS. 3, 5, and 6 are sequentially performed, the durability and lifespan of the fuel cell modules MD may be improved by appropriately resting and restarting the fuel cell modules MD included in the fuel cell power generation system, the target output desired for the fuel cell power generation system to output may be stably maintained without interruption. Thus, electric power of excellent quality may be supplied to the power network.

Figure 7:
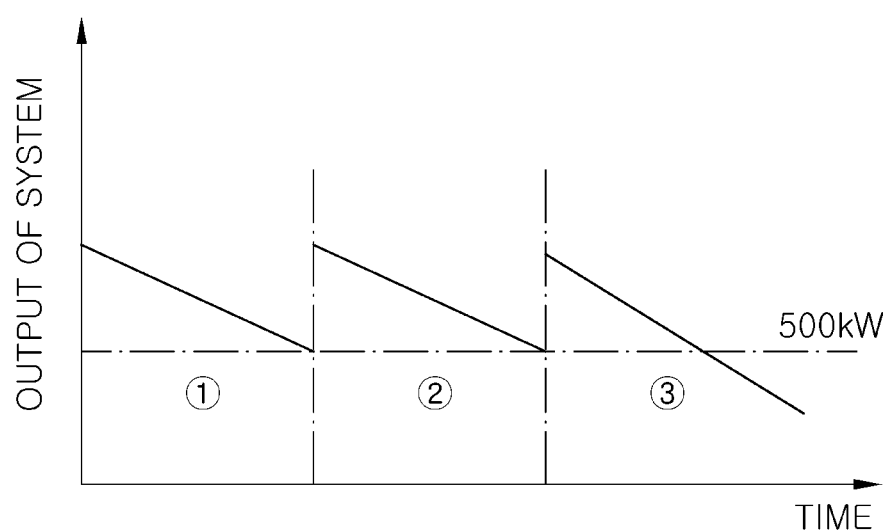
FIG. 7 is a graph representing a process of continuously outputting a target output by sequentially performing methods shown in FIGS. 3, 5, and 6 by the fuel cell power generation system.

For reference, FIG. 7 is a graph representing a process of continuously outputting a target output of 500 kW by sequentially performing the methods shown in FIGS. 3, 5, and 6 by the fuel cell power generation system. In this case, ① indicates an operating period according to the method shown in FIG. 3, ②indicates an operating period according to the method shown in FIG. 5, and ③ indicates an operating period according to the method shown in FIG. 6. A solid line indicates the available output of the system during each operating period. When the available output is reduced to less than 500 kW during the operating period ③, the fuel cell modules MD need to be repaired or replaced.

The cycle may be set to a resting time for which, in consideration of both a degree of performance reduction of the fuel cell modules MD depending on a resting time during operation of the fuel cell modules MD in a normal condition and a degree of performance reduction of the fuel cell modules MD depending on a resting time during operation of the fuel cell modules MD in an accelerated degradation condition, both degrees of performance reduction of the fuel cell modules MD are minimized.

FIG. 8 is a table representing test results acquired by varying the resting time and the operating time during operation of the fuel cell modules in the normal condition. It may be confirmed that performance reduction of the fuel cell modules MD is minimized when the resting time is 3 hours, and performance of the fuel cell modules MD when the resting time is 9 hours is further reduced than when the resting time is 0.5 hours.

FIG. 9 is a table representing a degree of performance reduction depending on the resting time during operation of the fuel cell modules in the accelerated degradation condition. It is confirmed that performance reduction of the fuel cell modules MD when the resting time is 3 hours is increased compared to when the resting time is 0.5 hours but is decreased compared to when the resting time is 9 hours. Thus the resting time of 3 hours is advantageous.

Here, the dependence of performance reduction on the resting time during operation of the fuel cell modules in the accelerated degradation condition is measured while repeating a process of sequentially performing a catalyst degradation operation. In this process, the fuel cell modules MD are operated at a temperature of 80° C. and a relative humidity of 100% and in a loaded state, and an electrolyte membrane degradation operation, in which the fuel cell modules MD are operated at a temperature of 80° C. and in a non-humidified and non-loaded state, 100 times and then resting the fuel cell modules MD.

To summarize the results shown in FIGS. 8 and 9, the resting time, for which both the degrees of performance reduction of the fuel cell modules MD depending on the resting time during operation of the fuel cell modules MD in the normal condition and the resting time during operation of the fuel cell modules MD in the accelerated degradation condition are minimized, may be determined as 3 hours.

Therefore, the cycle may be set to be in a time range that is greater than 0.5 hours but is less than or equal to 3 hours.

For reference, during the operating periods shown in FIGS. 3, 5 and 6, the cycle is set to 3 hours, and the process of sequentially resting some of the fuel cell modules MD included in the fuel cell power generation system for 3 hours during operation of the fuel cell power generation system and then restarting the corresponding fuel cell modules MD is repeated.

As is apparent from the above description, a method for operating a fuel cell power generation system according to embodiments of the present disclosure may improve durability of the fuel cell power generation system while maintaining the stable operation rate of the fuel cell power generation system, thereby being capable of improving the lifespan of the fuel cell power generation system.

Although preferred embodiments of the present disclosure have been disclosed for illustrative purposes, those skilled in the art will appreciate that various modifications, additions and substitutions are possible, without departing from the scope and spirit of the disclosed embodiments as presented in the accompanying claims.

What is claimed is:

1. A method for operating a fuel cell power generation system, the method comprising:
sequentially resting fuel cell modules corresponding to a designated reference module number, from among all fuel cell modules of a fuel cell power generation system, during a designated number of cycles while operating remaining fuel cell modules;
reducing a number of the fuel cell modules sequentially rested during the cycles from the reference module number, whenever average performance of the fuel cell modules is sequentially reduced, by exceeding designated reference levels configured to be sequentially set; and
repairing or replacing the fuel cell modules when the average performance of the fuel cell modules is reduced by a designated lower limit or more.

2. The method according to claim 1, wherein, as the average performance of the fuel cell modules is reduced, the average performance of the fuel cell modules is reduced by the lower limit in a state in which the number of the fuel cell modules sequentially rested during the cycles is reduced to 0.

3. The method according to claim 1, wherein the reference module number is set to 20% of a total number of the fuel cell modules of the fuel cell power generation system.

4. The method according to claim 1, wherein the designated reference levels configured to compare the average performance of the fuel cell modules therewith is set to be sequentially reduced by 10% from the average output performance of new fuel cell modules.

5. The method according to claim 1, wherein the lower limit is set to be reduced by 30% from the average output performance of new fuel cell modules.

6. The method according to claim 1, wherein the cycle is set to a resting time for which, in consideration of both a degree of performance reduction of the fuel cell modules depending on a resting time during operation of the fuel cell modules in a normal condition and a degree of performance reduction of the fuel cell modules depending on a resting time during operation of the fuel cell modules in an accelerated degradation condition, both degrees of performance reduction of the fuel cell modules are minimized.

7. The method according to claim 6, wherein the cycle is set to be in a time range that is greater than 0.5 hours and is less than or equal to 3 hours.

8. The method according to claim 1, wherein the cycle is set to 3 hours, and a process of sequentially resting some of the fuel cell modules of the fuel cell power generation system for 3 hours during operation of the fuel cell power generation system and then restarting the corresponding fuel cell modules is repeated.

* * * * *